United States Patent
Asai

(10) Patent No.: US 10,924,624 B2
(45) Date of Patent: *Feb. 16, 2021

(54) COMPUTER READABLE RECORDING MEDIUM, INFORMATION PROCESSING APPARATUS, AND INFORMATION PROCESSING METHOD

(71) Applicant: BROTHER KOGYO KABUSHIKI KAISHA, Nagoya (JP)

(72) Inventor: Norihiko Asai, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,939

(22) Filed: Jul. 17, 2019

(65) Prior Publication Data

US 2020/0053246 A1    Feb. 13, 2020

Related U.S. Application Data

(63) Continuation of application No. 15/828,538, filed on Dec. 1, 2017, now Pat. No. 10,375,265, which is a
(Continued)

(30) Foreign Application Priority Data

Mar. 25, 2011  (JP) ................. 2011-069000

(51) Int. Cl.
*H04N 1/21*  (2006.01)
*H04N 1/00*  (2006.01)
*H04N 1/04*  (2006.01)

(52) U.S. Cl.
CPC ....... *H04N 1/2166* (2013.01); *H04N 1/00225* (2013.01); *H04N 1/00307* (2013.01);
(Continued)

(58) Field of Classification Search
CPC .... H04N 1/2166; H04N 1/00225; G06F 3/00; H04W 4/00
(Continued)

(56) References Cited

U.S. PATENT DOCUMENTS 6,049,390 A   4/2000 Notredame et al.
6,259,456 B1  7/2001 Gibson et al.
(Continued)

FOREIGN PATENT DOCUMENTS

JP   H04-190421 A   7/1992
JP   H05-257669 A   10/1993
(Continued)

OTHER PUBLICATIONS

Japan Patent Office, Notification of Reasons for Refusal for Japanese Patent Application No. 2011-069000 counterpart Japanese patent application), dated Feb. 26, 2013.
(Continued)

*Primary Examiner* — Samantha (Yuehan) Wang
(74) *Attorney, Agent, or Firm* — Merchant & Gould P.C.

(57) ABSTRACT

An information processing apparatus includes: a data sharing unit configured to cause an application selected as a data output destination to process data which is output by an application which is a data output source; a process-object-data generation control unit configured to generate process object data in one of a first format and a second format based on image data acquired by an image information interface from an image information source; and an application-information display unit configured to display identification images for identifying applications which the data sharing unit can select as the data output destination if the data sharing unit is to process either data of the first format or data of the second format.

11 Claims, 11 Drawing Sheets

Related U.S. Application Data continuation of application No. 14/623,187, filed on Feb. 16, 2015, now Pat. No. 9,894,238, which is a continuation of application No. 13/422,375, filed on Mar. 16, 2012, now Pat. No. 8,957,901.

(52) U.S. Cl.
CPC ....... *H04N 1/0417* (2013.01); *H04N 1/00233* (2013.01); *H04N 1/00411* (2013.01); *H04N 1/00427* (2013.01); *H04N 1/00435* (2013.01); *H04N 1/00458* (2013.01); *H04N 1/00477* (2013.01); *H04N 2201/0039* (2013.01); *H04N 2201/0046* (2013.01); *H04N 2201/0055* (2013.01); *H04N 2201/0094* (2013.01)

(58) Field of Classification Search
USPC .......................................................... 345/501
See application file for complete search history.

(56) References Cited

U.S. PATENT DOCUMENTS

| | | | |
|---|---|---|---|
| 6,707,463 | B1 | 3/2004 | Gibson et al. |
| 6,775,678 | B1 | 8/2004 | Hillberg et al. |
| 7,543,246 | B2 | 6/2009 | Mifune |
| 7,911,643 | B2 | 3/2011 | Yamada et al. |
| 8,319,989 | B2 | 11/2012 | Mizunashi et al. |
| 8,957,901 | B2 | 2/2015 | Asai |
| 9,294,647 | B2 | 3/2016 | Yamada et al. |
| 2001/0025326 | A1 | 9/2001 | Kizaki |
| 2001/0040589 | A1 | 11/2001 | De Bliek et al. |
| 2003/0099379 | A1 | 5/2003 | Monk et al. |
| 2003/0154207 | A1 | 8/2003 | Naito |
| 2003/0184803 | A1 | 10/2003 | Yamada et al. |
| 2005/0063004 | A1 | 3/2005 | Silverbrook et al. |
| 2005/0114766 | A1 | 5/2005 | Yamamoto |
| 2005/0229010 | A1 | 10/2005 | Monk et al. |
| 2006/0028675 | A1 | 2/2006 | Watanabe et al. |
| 2006/0055766 | A1 | 3/2006 | Kawata et al. |
| 2006/0066621 | A1 | 3/2006 | Herceg et al. |
| 2007/0206088 | A1 | 9/2007 | Mizunashi |
| 2008/0062464 | A1 | 3/2008 | Sugi |
| 2008/0068640 | A1 | 3/2008 | Todaka |
| 2008/0212129 | A1 | 9/2008 | Yoshiida |
| 2008/0282065 | A1 | 11/2008 | Imamichi |
| 2009/0034782 | A1 | 2/2009 | Gering |
| 2009/0051947 | A1 | 2/2009 | Kuroshima |
| 2009/0109458 | A1 | 4/2009 | Nagata |
| 2009/0109483 | A1 | 4/2009 | Shimmoto |
| 2009/0161970 | A1 | 6/2009 | Harada |
| 2009/0244592 | A1 | 10/2009 | Grams |
| 2009/0284611 | A1 | 11/2009 | Wood et al. |
| 2009/0324013 | A1 | 12/2009 | Tanaka |
| 2010/0027062 | A1 | 2/2010 | Takashima |
| 2010/0053696 | A1 | 3/2010 | Sasano et al. |
| 2010/0118338 | A1 | 5/2010 | Sakiyama et al. |
| 2010/0118344 | A1 * | 5/2010 | Asano ................ H04N 1/00408 358/1.15 |
| 2010/0146442 | A1 | 6/2010 | Nagasaka et al. |
| 2011/0004830 | A1 | 1/2011 | Von Kaenel et al. |
| 2011/0047450 | A1 | 2/2011 | Park et al. |
| 2011/0099093 | A1 | 4/2011 | Mills |
| 2011/0161076 | A1 | 6/2011 | Davis et al. |
| 2011/0225490 | A1 | 9/2011 | Meunier |
| 2011/0296439 | A1 | 12/2011 | Kozaki |
| 2012/0063700 | A1 | 3/2012 | Ignatchenko et al. |
| 2012/0243043 | A1 | 9/2012 | Asai |
| 2012/0243048 | A1 | 9/2012 | Asai |
| 2012/0293832 | A1 | 11/2012 | Fujita |
| 2012/0307275 | A1 | 12/2012 | Tamashima |
| 2013/0063619 | A1 | 3/2013 | Asai |
| 2013/0076705 | A1 | 3/2013 | Murata |
| 2013/0094056 | A1 | 4/2013 | Kobayashi |
| 2013/0195421 | A1 | 8/2013 | Chen et al. |
| 2014/0002857 | A1 | 1/2014 | Huang et al. |
| 2014/0365919 | A1 | 12/2014 | Shaw et al. |
| 2015/0128067 | A1 | 5/2015 | Wong et al. |

FOREIGN PATENT DOCUMENTS

| | | |
|---|---|---|
| JP | H11-065795 A | 3/1999 |
| JP | 11-316693 A | 11/1999 |
| JP | 2001-256186 A | 9/2001 |
| JP | 2003-241879 A | 8/2003 |
| JP | 2004-007517 A | 1/2004 |
| JP | 2005-049928 A | 2/2005 |
| JP | 2005-190414 A | 7/2005 |
| JP | 2006-086727 A | 3/2006 |
| JP | 2007-251522 A | 9/2007 |
| JP | 2008-72240 A | 3/2008 |
| JP | 2008-236421 A | 10/2008 |
| JP | 2008-283441 A | 11/2008 |
| JP | 2009-111904 A | 5/2009 |
| JP | 2010-157207 A | 7/2010 |
| JP | 2011-029746 A | 2/2011 |
| JP | 2012-203740 A | 10/2012 |
| JP | 2012-203742 A | 10/2012 |
| JP | 2012-248051 A | 12/2012 |
| JP | 2013-058114 A | 3/2013 |
| JP | 2013-077126 A | 4/2013 |
| WO | 2008-041318 A1 | 4/2008 |

OTHER PUBLICATIONS

U.S. Office Action issued in related U.S. Appl. No. 14/338,723 dated Apr. 6, 2015.
U.S. Office Action issued in related U.S. Appl. No. 14/572,962, dated Aug. 28, 2015.
U.S. Office Action issued in related U.S. Appl. No. 14/338,723 dated Nov. 19, 2015.
U.S. Office Action issued in related U.S. Appl. No. 14/338,723 dated Apr. 8, 2016.
Related U.S. Appl. No. 14/338,723, filed Jul. 23, 2014, 75 pages.
Notice of Reasons for Refusal issued in corresponding Japanese Patent Application No. 2013-152939 dated Feb. 8, 2017.
IDS JP2005190414A English Translation, 2005; in parent application.
IDS JP2008283441A English Translation, 2008; in parent application.
IDS JP2011029746A English Translation, 2011; in parent application.
IDS JP2013058114A English Translation, 2013; in parent application.
IDS JP2013077126A, English Translation 2013; in parent application.
U.S. Office Action issued in related U.S. Appl. No. 15/401,356, dated Mar. 26, 2018.
Office Action (Notification of Reasons for Refusal) issued in related Japanese Patent Application No. 2017-220707, dated Aug. 14, 2018.
Office Action (Notification of Reasons for Refusal) issued in related Japanese Patent Application No. 2017-143713, dated Sep. 25, 2018.
Office Action (Notice of Allowance) issued in related U.S. Appl. No. 15/401,356, dated Nov. 1, 2018.
Office Action issued in corresponding Japanese Patent Application No. 2019-173823, dated Oct. 20, 2020.

* cited by examiner

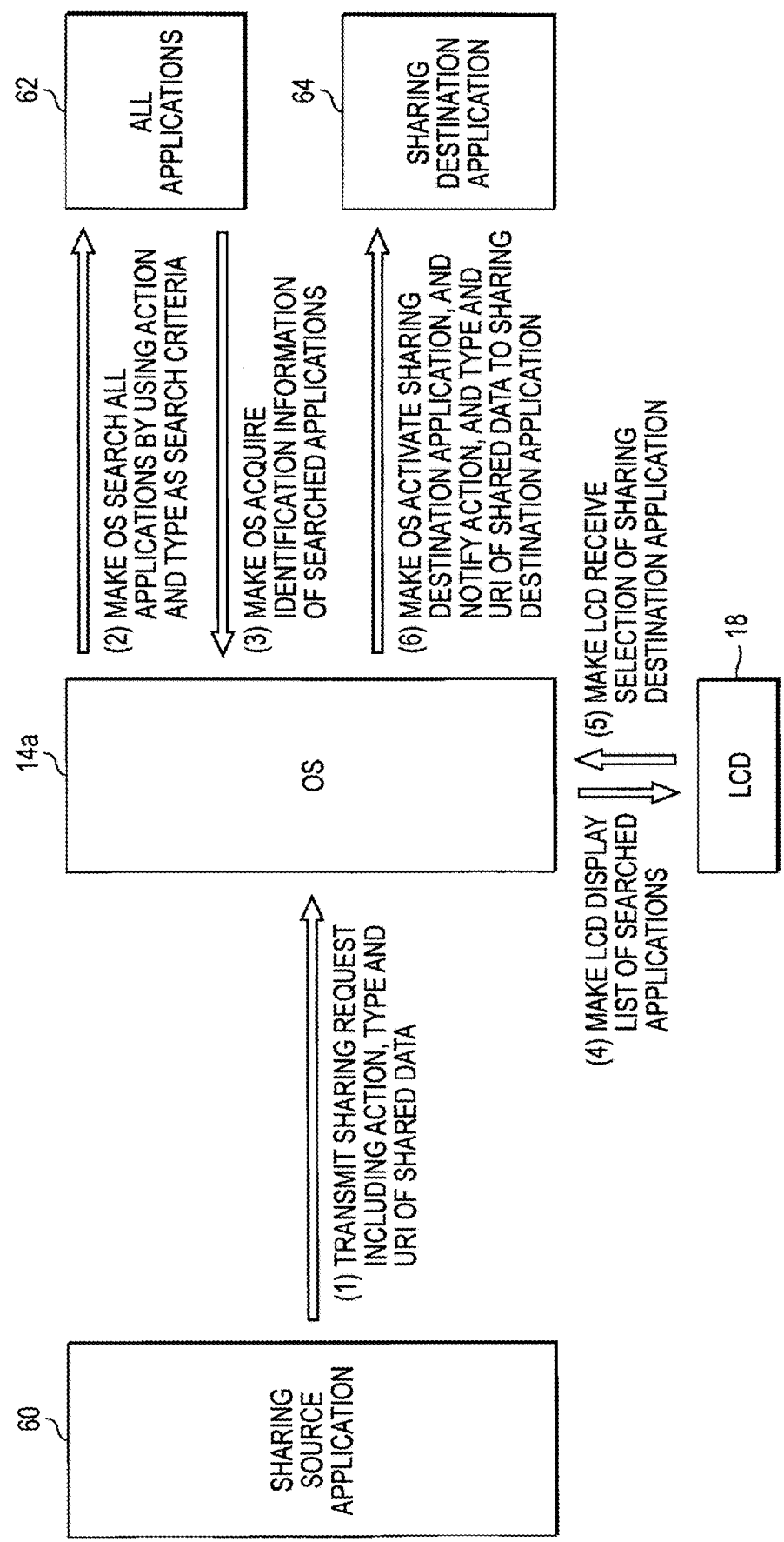

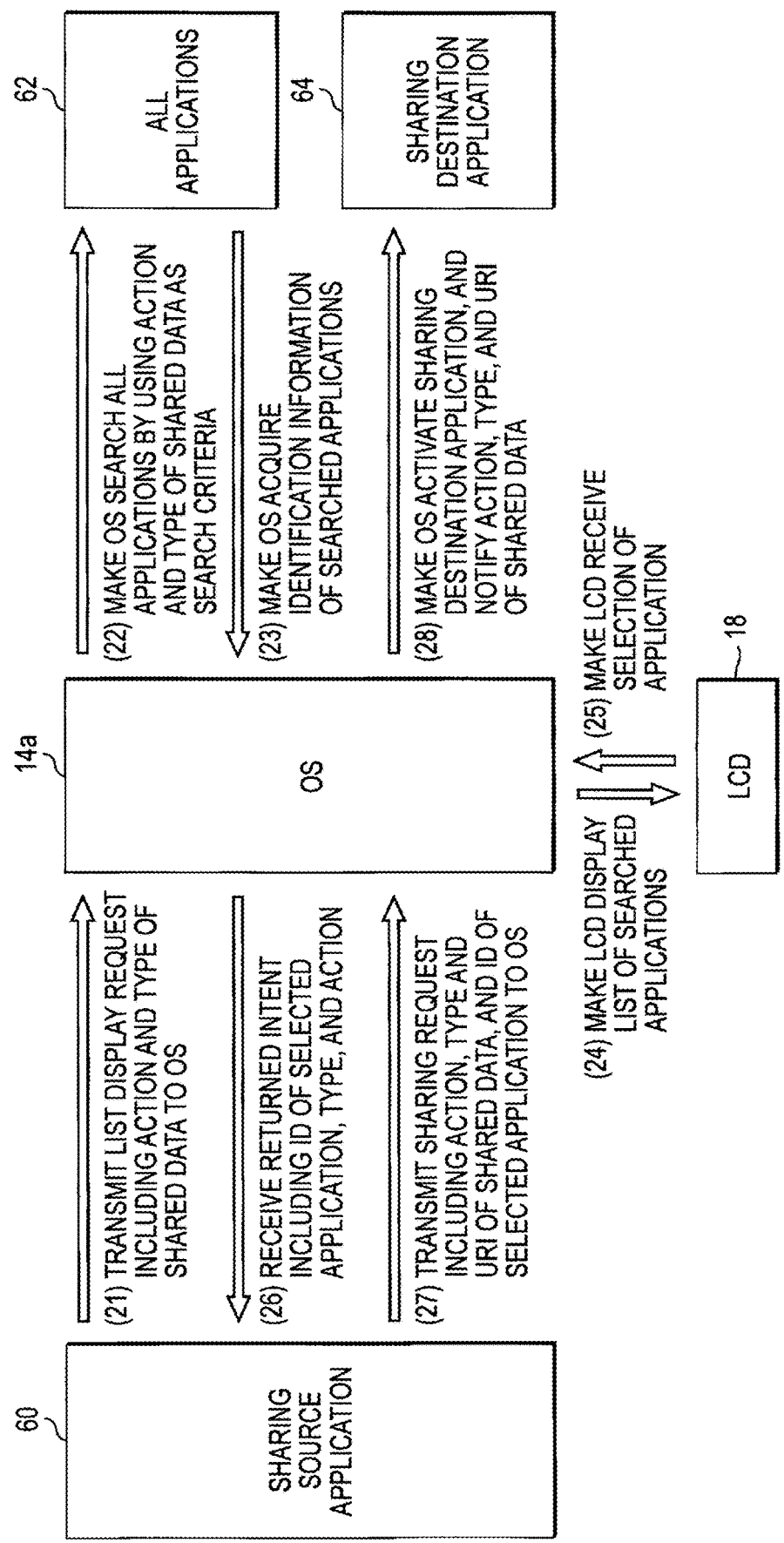

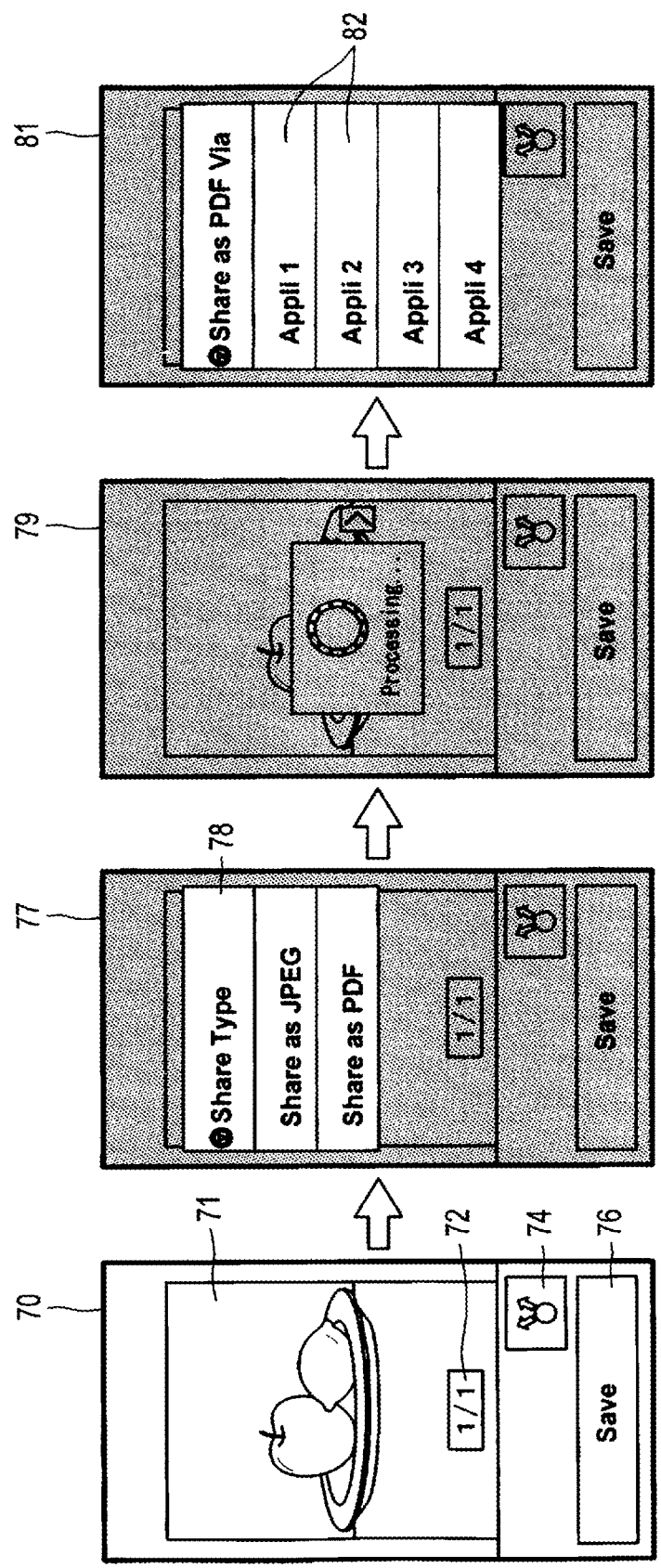

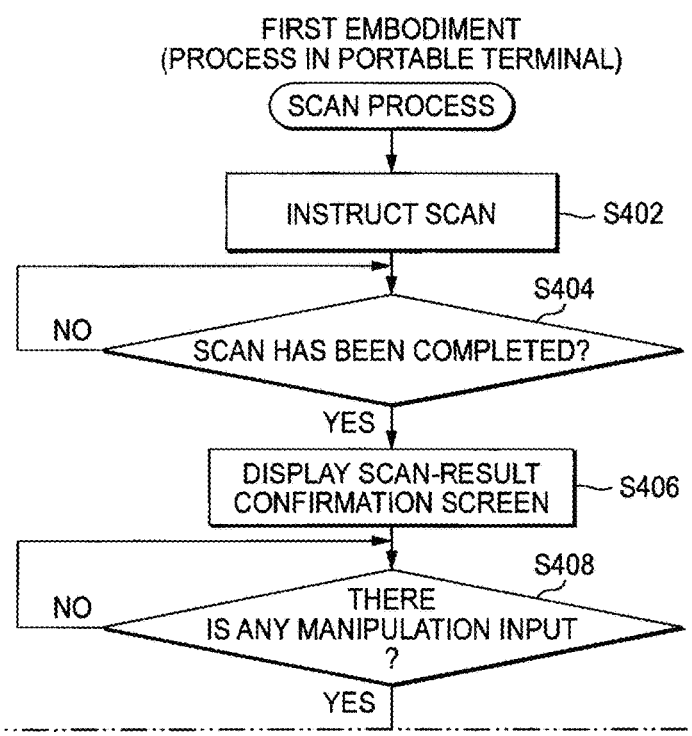

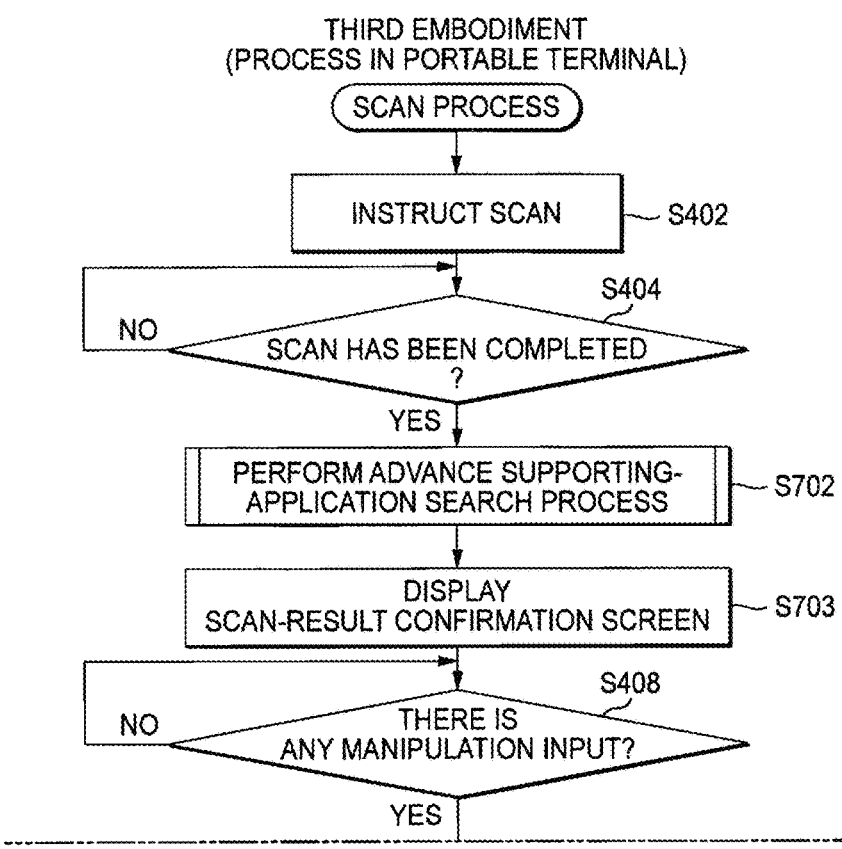

COMPUTER READABLE RECORDING MEDIUM, INFORMATION PROCESSING APPARATUS, AND INFORMATION PROCESSING METHOD

CROSS-REFERENCE TO RELATED APPLICATION

This application is a continuation of U.S. patent application Ser. No. 15/828,538, filed Dec. 1, 2017, which is a continuation of U.S. patent application Ser. No. 14/623,187, filed Feb. 16, 2015, which is a continuation of U.S. patent application Ser. No. 13/422,375, filed Mar. 16, 2012, which claims the benefit of priority of Japanese Patent Application No. 2011-069000 filed on Mar. 25, 2011, the contents of all referenced applications are incorporated herein by reference in its entirety.

BACKGROUND

The present disclosure relates to a computer readable recording medium storing an information processing program, an information processing apparatus, and an information processing method.

In portable terminals, there are portable terminals having a function called 'sharing function'. The sharing function is a function of providing data processed in one application to another application, and making the anther application process the data. For example, in a case where image data is obtained by imaging of a digital camera built in a portable terminal, and a JPEG file is generated from the image data by a camera application, for example, the JPEG file can be provided to an e-mail application by the sharing function such that the JPEG file can be transmitted as an attachment of an e-mail. As described above, according to the sharing function, it is possible to make a plurality of applications cooperate with one another such that a wide variety of processes can be performed in the portable terminal. Further, the application that is capable of processing JPEG files is not limited to the e-mail application. There may be a plurality of kinds of applications that is capable of processing JPEG files. For example, a technology for activating different JPEG applications according to folders including JPEG files stored therein is known.

SUMMARY

However, in the related art, any application for appropriately processing scan data, which is output by a scanner, in a portable terminal has not existed. For example, a camera application handles photo data obtained by imaging of the digital camera, and thus is configured to save (store) the data, uniformly as JPEG format files. In contrast, a scanner can generate scan data from various documents such as a photo image or a text, and thus it may not be necessarily appropriate to store the scan data in a JPEG format.

As described above, in order to appropriately process various image data such as scan data, it is desired to provide an application which has a high degree of usability and is capable of coping with forms of use and situations which has not been supposed in the camera application according to the related art.

An aspect of the present disclosure was made to solve the above-mentioned problem, and an object is to provide an information processing program, an information processing apparatus, and an information processing method having a high degree of usability.

The aspect of the present disclosure provides the following arrangements.

A non-transitory computer readable recording medium storing an information processing program to be executed by a computer of an information processing apparatus including a display unit and a data sharing unit configured to cause an application selected as a data output destination to process data which is output by an application which is a data output source, the information processing program comprising:

a process-object-data generation control instruction that causes the computer to generate process object data in one of a first format and a second format based on image data acquired by an image information interface from an image information source; and an application-information display control instruction that causes the display unit to display identification images for identifying applications which the data sharing unit can select as the data output destination if the data sharing unit is to process either data of the first format or data of the second format.

An information processing apparatus comprising:

a data sharing unit configured to cause an application selected as a data output destination to process data which is output by an application which is a data output source;

a process-object-data generation control unit configured to generate process object data in one of a first format and a second format based on image data acquired by an image information interface from an image information source; and an application-information display unit configured to display identification images for identifying applications which the data sharing unit can select as the data output destination if the data sharing unit is to process either data of the first format or data of the second format.

An information processing method which is performed in an information processing apparatus including a data sharing unit configured to cause an application selected as a data output destination to process data which is output by an application which is a data output source, the information processing method comprising:

generating process object data in one of a first format and a second format based on image data acquired by an image information interface from an image information source; and displaying identification images for identifying applications which the data sharing unit can select as the data output destination if the data sharing unit is to process either data of the first format or data of the second format.

BRIEF DESCRIPTION OF DRAWINGS

FIGS. 2A and 2B are views illustrating sharing functions.

FIG. 3 is a view illustrating screen transitions in the portable terminal.

FIGS. 4A and 4B are a flow chart illustrating a scan process of the first embodiment.

FIGS. 7A and 7B are a flow chart illustrating a scan process of a third embodiment.

DESCRIPTION OF EXEMPLARY EMBODIMENTS

Figure 1:
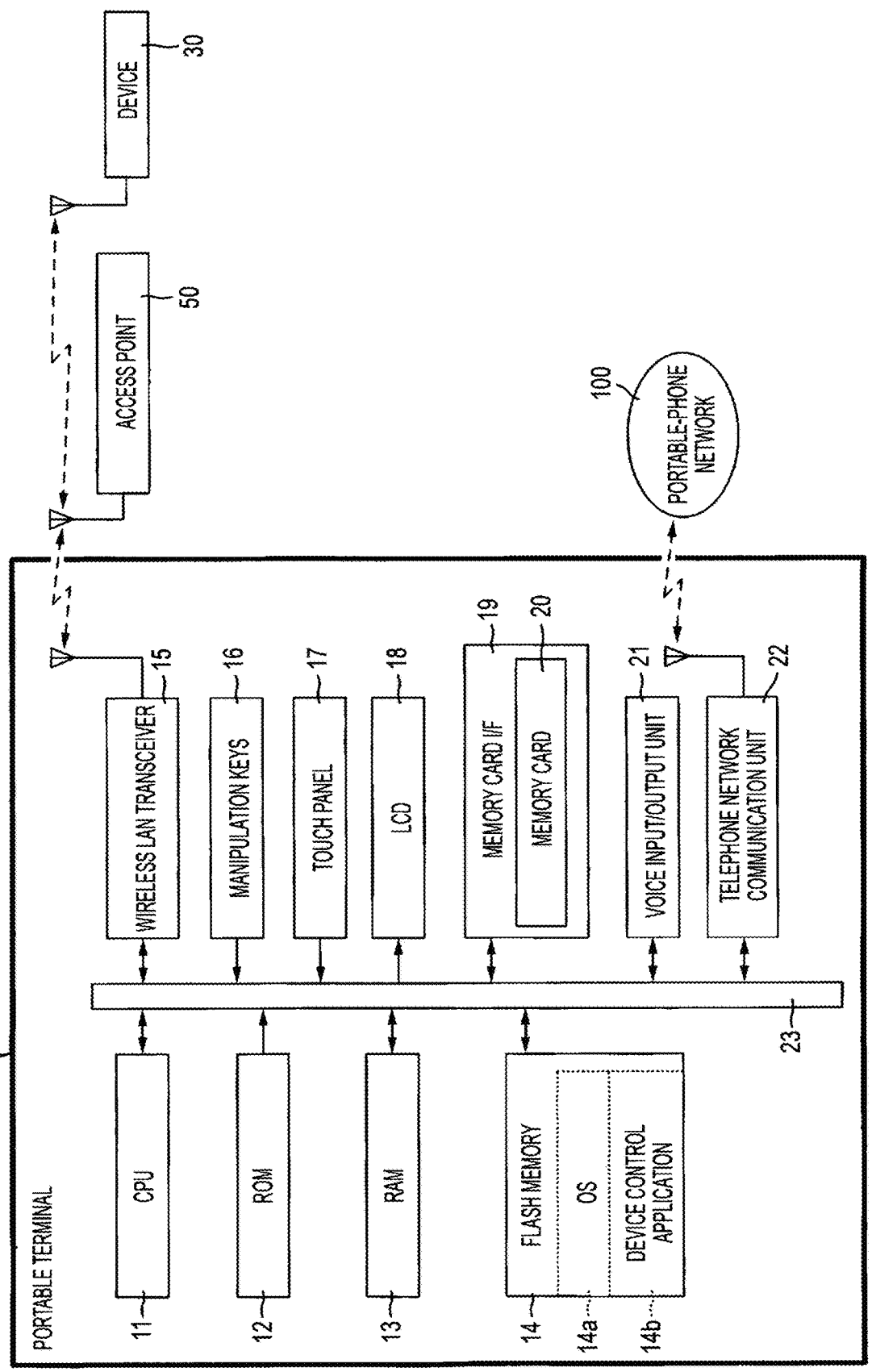
FIG. 1 is a block diagram illustrating an electrical configuration of a portable terminal having a device control application installed therein, according to a first embodiment.

Hereinafter, embodiments will be described with reference to the accompanying drawings. FIG. 1 is a block diagram illustrating an electrical configuration of a portable terminal 10 having a device control application 14b (hereinafter, referred to as a present application 14b) installed therein, according to a first embodiment of the present embodiment.

The portable terminal 10 is a portable phone that enables a voice call with another device through a portable-phone network 100 or can use the Internet. Further, the portable terminal 10 performs wireless communication with the device 30 by an infrastructure mode through an access point 50. The portable terminal 10 includes a CPU 11, a ROM 12, a RAM 13, a flash memory 14, a wireless LAN transceiver 15, manipulation keys 16, a touch panel 17, a liquid crystal display 18 (hereinafter, referred to as an LCD 18), a memory card interface 19 (hereinafter, referred to as a memory card I/F 19), a voice input/output unit 21, and a telephone network communication unit 22. These components are connected to one another through bus lines 23.

The CPU 11 controls each of the units connected to the bus lines 23, in accordance with fixed values, programs, and the like stored in the ROM 12 or the like. The ROM 12 is a non-volatile memory which is rewritable, and the RAM 13 is a volatile memory which is not rewritable. The flash memory 14 is a non-volatile memory which is rewritable, and stores an operating system 14a (hereinafter, referred to as an OS 14a), the present application 14b, and a plurality of kinds of other applications (not shown). The OS 14a is basic software for implementing the standard functions of the portable terminal 10, and is an Android (registered as a trademark) OS in the present embodiment. The device control application 14b is provided by a vendor of the device 30, and is installed in the portable terminal 10 by the user.

Hereinafter, the CPU 11 which executes a program such as an application, an operating system, or the like may be referred to simply as the name of the program. For example, a term 'application' may mean 'the CPU 11 that executes an application'.

Applications use the API of the OS 14a installed in the portable terminal 10 to implement a sharing function (intent function) of providing and receiving data between the applications. The present application 14b installed in the portable terminal 10 is for allowing a user to directly use the printing function and scanning function of a device 30 from the portable terminal 10, without passing through a personal computer or the like. Particularly, the present application 14b is configured to have a high degree of usability in a case of providing scan date, acquired from the device 30, to another application by the sharing function.

The wireless LAN transceiver 15 is a circuit for making a Wi-Fi (registered as a trademark) connection between the portable terminal 10 and another device by a wireless LAN based on the standards of IEEE 802.11b and 802.11g. The portable terminal 10 is wirelessly connected with the device 30 through the access point 50 by the wireless LAN transceiver 15.

The manipulation keys 16 are hard keys provided to the housing of the portable terminal 10, and are used for inputting option information or instructions to the portable terminal 10. The touch panel 17 is provided to overlap the LCD 18, and is used for inputting option information and instructions to the portable terminal 10. The LCD 18 displays various manipulation screens, and images based on selected data. The memory card I/F 19 is an interface for installing a non-volatile memory card 20, and controls writing or reading of data on the memory card 20. The memory card 20 may be an SD card (registered as a trademark). In the present embodiment, the present application 14b converts scan data received from the device 30 into a PDF format file (hereinafter, referred to as PDF data) or a JPEG format file (hereinafter, referred to as JPEG data), and stores the converted data in the memory card 20.

The voice input/output unit 21 is a unit which is for voice input and output and includes a microphone, a speaker, and so on, and the telephone network communication unit 22 is a circuit for performing communication through the portable-phone network 100. The portable-phone network 100 is a communication network based on international mobile telecommunication-2000 (IMT-2000), and enables use of a voice call through the portable terminal 10.

Each of the applications (including the present application 14b) installed in the portable terminal 10 calls the API of the OS 14a, and outputs data for each component of the portable terminal 10, such as the wireless LAN transceiver 15, the manipulation keys 16, the touch panel 17, the LCD 18, the memory card I/F 19, the voice input/output unit 21, and the telephone network communication unit 22, to the OS 14a. In other words, each application controls each component of the portable terminal 10 by calling the API of the OS 14a. Further, each application calls the API of the OS 14a, and acquires data output from each component of the portable terminal 10, and data representing a status of each component, from the OS 14a. That is, each application acquires data representing a status of each component of the portable terminal 10 (including a status of manipulation input to the portable terminal 10), from the OS 14a, by calling the API of the OS 14a. The OS 14a may notify the data which each component of the portable terminal 10 outputs, and the data representing the status of each component, to each application, regularly or whenever the status of each component changes. In other words, each application receives the notification from the OS 14a, thereby acquiring the data representing the status of each component of the portable terminal 10 (including the status of the manipulation input to the portable terminal 10) from the OS 14a.

The device 30 is a multi-function device having a printer function, a scanning function, a copy function, and the like, includes a wireless LAN transceiver (not shown) having the same configuration as that of the wireless LAN transceiver 15 of the portable terminal 10, and makes a Wi-Fi connection with the portable terminal 10 by wireless communication through the access point 50. Further, the device 30 is controlled by the present application 14b of the portable terminal 10, such that the device 30 prints images based on data received from the portable terminal 10, or reads a document to generate scan data and transmits the scan data to the portable terminal 10.

The sharing function that is implemented by using the API of the OS 14a of the portable terminal 10 will be described with reference to FIGS. 2A and 2B. The sharing function is a function of making a data output destination application process data which is output by a data output source application. Examples of the sharing function include an implicit sharing function and an explicit sharing function. FIG. 2A is a view illustrating an implicit sharing function, and shows a process flow in a case where a data output source application (hereinafter, referred to as a sharing source application 60) makes a request to the OS 14*a* to perform the implicit sharing function.

As shown in FIG. 2A, in the implicit sharing function, the sharing source application 60 calls the API of the OS 14*a*, and makes a request to the OS 14*a* to perform the sharing function (see (1) of FIG. 2A). This request includes the uniform resource identifier (URI) and type of data (hereinafter, referred to as shared data) to be processed in another application process by the sharing function, and an action. The URI is information representing the location of the shared data, and is composed of a file path in the present embodiment. The type is information which designates the format of the shared data, and the action is information which designates the kind of a process. The OS 14*a* searches all applications (hereinafter, referred to as all application 62) installed in the portable terminal 10 for candidates for a data output destination application (hereinafter, referred to as a sharing destination application 64), by using the type and the action notified from the sharing source application 60, as search criteria (see (2) of FIG. 2A).

Each application installed in the portable terminal 10 declares a type which designates a format which the corresponding application can process, and an action which designates the kind of an executable process, in advance. Therefore, the OS 14*a* searches all application 62 by using the type and the action notified from the sharing source application 60 as the search criteria. Then, OS 14*a* extracts applications which can process data having the format designated by the type notified from the sharing source application 60, and support the kind of the process designated by the action notified from the sharing source application 60, and acquires identification information of the extracted applications. The developer of each application can feely set the type and the action which the corresponding application declares. For this reason, each application may declare a process which the corresponding application cannot actually perform, as the action. Therefore, an application supporting the type of the process which is designated by the action notified from the sharing source application 60 means an application that declares the same action as the action notified from the sharing source application 60, and is not required to actually perform the corresponding process.

Next, the OS 14*a* makes the LCD 18 display a list of the searched applications, that is, the applications which are candidates for the sharing destination application 64 (see (4) of FIG. 2A). Then, if a user selects any one application as the sharing destination application 64 from the list (see (5) of FIG. 2A), the OS 14*a* activates the sharing destination application 64, sets a screen of the sharing destination application 64 in the foreground (forefront), and notifies the URI and type of the shared data, and the action notified from the sharing source application 60, to the sharing destination application 64 (see (6) of FIG. 2A).

As a result, the screen of the sharing destination application 64 selected by the user is displayed in the foreground, and the sharing destination application 64 accesses the shared data specified by the notified URI, and performs the process according to the value of the action. The sharing destination application 64 may perform various executable processes on the shared data. For example, the sharing destination application 64 may display the shared data, or transmit the shared data as an attachment of an e-mail, or edit the shared data.

FIG. 2B is a view illustrating the explicit sharing function, and shows a process flow in a case where the sharing source application 60 makes a request to the OS 14*a* to perform the explicit sharing function.

As shown in FIG. 2B, in the explicit sharing function, the sharing source application 60 calls the API of the OS 14*a*, and makes a request to the OS 14*a* to display a list of candidates for a sharing destination application 64 (see (21) of FIG. 2B). This request includes the type of shared data and an action. The OS 14*a* searches all application 62 installed in the portable terminal 10 for candidates for the sharing destination application 64, by using the type and action notified from the sharing source application 60, as the search criteria, (see (22) of FIG. 2B), and acquires the identification information of applications satisfying the search criteria (see (23) of FIG. 2B).

Next, the OS 14*a* makes the LCD 18 display a list of the candidates for the sharing destination application 64 found by the searching (see (24) of FIG. 2B). Then, if the user selects any one application (see (25) of FIG. 2B), the OS 14*a* returns an intent including the identification information of the selected application, and the type and the action used as the search criteria (see (26) of FIG. 2B). If receiving the intent from the OS 14*a*, the sharing source application 60 calls the API of the OS 14*a*, designates the identification information of the selected application included in the intent, the URI and type of the shared data, and the action, and makes a request to OS 14*a* to perform the sharing function (see (27) of FIG. 2B). The OS 14*a* activates the application (the sharing destination application 64) designated from the sharing source application 60, sets the screen of the sharing destination application 64, and notifies the sharing destination application 64 of the URI and type of the shared data and the action notified from the sharing source application 60.

That is, a sharing function which enables the sharing source application 60 to notify the OS 14*a* of the URI of the shared data and so on without recognizing the sharing destination application 64 is called the implicit sharing function, and a sharing function which enables the sharing source application 60 to designate the sharing destination application 64 and notify the OS 14*a* of the URI of the shared data and so on is called the explicit sharing function. The present application 14*b* will be described on the assumption that the present application 14*b* uses the explicit sharing function of the OS 14*a*.

FIG. 3 is a view illustrating screen transitions in a case where the user instructs sharing of scan data acquired from device 30 when the screen of the present application 14*b* is being displayed in the foreground.

If acquiring a scan data item from the device 30, the present application 14*b* makes the LCD 18 display a scan-result confirmation screen 70 including a scan image 71 corresponding to the scan data item.

The scan-result confirmation screen 70 further includes a page display area 72, a sharing button 74, and a saving button 76. The page display area 72 is an area for displaying the total number of pages of a document read in the device 30, and a page number representing the page number of the document corresponding to a currently displayed scan image 71.

The sharing button 74 is an area for inputting an instruction to perform the sharing function. If the user touches the sharing button 74, the scan data item corresponding to the currently displayed scan image 71 is determined as shared data.

The saving button 76 is an area for inputting an instruction to perform a saving function. If the user touches the saving button 76, the scan data item corresponding to the currently displayed scan image 71 is saved. Specifically, the scan data item is converted into a data item having a predetermined format, the API of the OS 14a is called, and the converted data item is saved in the memory card 20.

If the user touches the sharing button 74 on the scan-result confirmation screen 70, a currently displayed scan-result confirmation screen 70 on the LCD 18 transitions to a format selection screen 77 of the present application 14b. On the format selection screen 77, only a format selection area 78 is manipulable, and the sharing button 74 and the saving button 76 are grayed out so as not to be manipulable.

The format selection area 78 includes options for enabling the user to select any one of a PDF format and a JPEG format. The user selects a desired format to be used for sharing the scan data item with another application, and touches the option of the desired format to select the desired format.

If the user performs selection manipulation on the format selection screen 77 so as to select any one format, the format selection screen 77 on the LCD 18 transitions to a screen 79 during processing. While the screen 79 during processing is being displayed, a process object data item is generated in the selected format, the API of the OS 14a is called, and the process object data item is saved in the memory card 20. Further, while the screen 79 during processing is being displayed, any user' manipulation is not acceptable.

After the process object data item is generated, the present application 14b calls the API of the OS 14a, designates the type of the process object format and an action, and make a request to OS 14a to display a list of candidates for the sharing destination application 64. That is, the process shown by (21) of FIG. 2B is performed.

If receiving the list display request, the OS 14a searches for candidates for the sharing destination application 64 (FIG. 2B), and makes the LCD 18 to display a sharing-destination-application list screen 81 including the listed names 82 of the found applications, such that applications selectable as a data destination according the sharing function are shown in a list. Then, the user selects a desired application as the sharing destination application 64, from the displayed candidates. Therefore, the user can simply convert a scan data item acquired from the device 30 into a data item having a desired format, and select an appropriate sharing destination application 64 from a list of applications capable of processing the data item having the desired format. That is, the user can make the present application 14b and another application cooperate with each other by simple manipulation and a free combination, such that the scan data item acquired from the device 30 can be used in various forms, and thus the degree of usability is high.

Figure 4B:
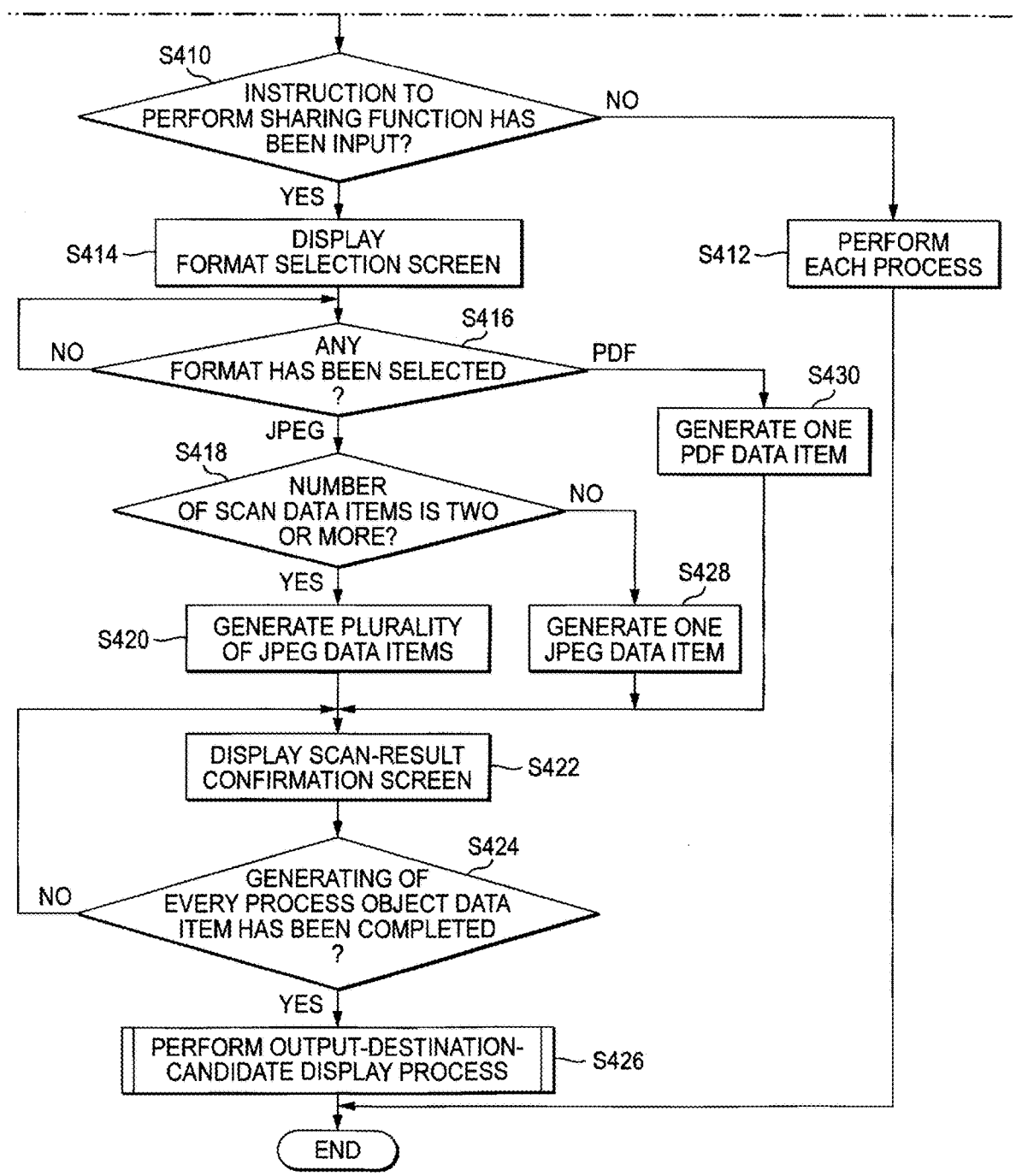

FIG. 4 is a flow chart illustrating a scan process of the CPU 11 of the portable terminal 10 according to the present application 14b. The scan process starts if the user instructs scanning from a manipulation receiving screen (not shown) of the present application 14b. It is assumed that the present application 14b makes the CPU 11 perform each step of flow charts of FIGS. 4 to 8 (to be described below) directly or through the functions of the OS 14a and the like. Some of steps of each the flow chart may be replaced with steps which the OS 14a or another application makes the CPU 11 perform. Alternatively, some of the steps of each flow chart may be replaced with steps which are implemented by operation of hardware provided in the portable terminal 10 without involvement of the CPU 11.

First, in STEP S402, the CPU 11 instructs the device 30 to transmit scan data, from the wireless LAN transceiver 15. According to the instruction of the portable terminal 10, the device 30 scans a document to generate scan data, and transmit the scan data to the portable terminal 10. The portable terminal 10 temporarily stores the scan data received from the device 30, in the RAM 13. In the present embodiment, the scan data is uncompressed or decompressed raw image data. Until the device 30 completes the scanning (in a case of No in STEP S404), the CPU 11 stands by.

If the device 30 completes the scanning (Yes in STEP S404), in STEP S406, the CPU 11 makes the LCD 18 display a scan-result confirmation screen 70 (FIG. 3). Then, if there is no manipulation input (No in STEP S408), the CPU 11 stands by. Meanwhile, if the manipulation keys 16 or the touch panel 17 is manipulated (Yes in STEP S408), and an instruction to perform a function other than the sharing function is input (No in STEP S410), in STEP S412, the CPU 11 performs each process (for example, a process of saving the scan data) according to the manipulation input. Then, the CPU 11 finishes the scan process.

Meanwhile, if an instruction to perform the sharing function is input (Yes in STEP S410), in STEP S414, the CPU 11 makes the LCD 18 display the format selection screen 77, so as to enable the user to select any one of the JPEG format and the PDF format. Various documents such as a photo image or a text can be read in the device 30. Therefore, in order to generate data in a format appropriate for the contents of the scan data, the user is enabled to select any one format.

Until any format is selected (in a case of No in STEP S416), the CPU 11 stands by. Meanwhile, if the touch panel 17 receives an instruction to designate the PDF format ('PDF' in STEP S416), in STEP S430, the CPU 11 generates PDF data from the scan data acquired from the device 30. In a case where a document of a plurality of pages is scanned in the device 30, the portable terminal 10 acquires a plurality of scan data items from the device 30. In this case, the CPU 11 generates one PDF data item including data of the plurality of pages, from the plurality of scan data items.

Meanwhile, in a case where the touch panel 17 receives an instruction to designate the JPEG format ('JPEG' in STEP S416), if one scan data item is acquired from the device 30, that is, if a document of one page has been scanned in the device 30 (No in STEP S418), in STEP S428, the CPU 11 generates one JPEG data item from the scan data item.

Meanwhile, in a case where a plurality of scan data items is acquired from the device 30, for example, in a case where a document of a plurality of pages has been scanned in the device 30 (Yes in STEP S418), in STEP S420, the CPU 11 generates one JPEG data item from each of the plurality of scan data items so as to generate a plurality of JPEG data items.

Next, in STEP S422, the CPU 11 makes the LCD 18 display the screen 79 during processing. Then, while each process object data item is being generated (each JPEG data item is being generated in STEP S420 or STEP S428 or each PDF data item is being generated in STEP S430) (No in STEP S424), the CPU 11 repeats the scan process from STEP S422. In the present embodiment, generating of each process object data item is a process of generating a file, constituting the corresponding process object data item, in the memory card 20, writing the corresponding process object data item in the file, and closing the file. Meanwhile, if the generating of the process object data item is completed (Yes in STEP S424), in STEP S426, the CPU 11 performs an output-destination-candidate display process, so as to make the LCD 18 display the sharing-destination-application list screen 81 (FIG. 3). Then, the CPU 11 finishes the scan process. The output-destination-candidate display process (STEP S426) will be described below with reference to FIG. 5.

According to the scan process of the present embodiment, after every process object data item selected by the user is generated, the sharing-destination-application list screen 81 is displayed on the LCD 18. In other words, before the sharing-destination-application list screen 81 is displayed, the generating of every process object data item is completed.

Therefore, at the time when the application selected as the sharing destination application 64 from the sharing-destination-application list screen 81 by the user processes the process object data which is the shared data, the process object is already prepared in the memory card 20 and is accessible by the sharing destination application 64. Therefore, it is possible to reliably make the sharing destination application 64 process the process object data.

Also, according to the present embodiment, since data is generated only in the format (process data format) selected by the user, it is possible to omit generating of data in an unnecessary format, and thus to reduce a process load.

Further, since general-purpose PDF data or JPEG data is generated from low-compatibility raw image data, and is processed in the sharing destination application, it is possible to select various applications as the sharing destination application 64. In other words, it is possible to use the scan data acquired from the device 30 in a wide variety of forms.

Furthermore, in a case where an instruction to perform the sharing function is input, the format selection screen 77 is displayed. Therefore, it is possible to show the user that it is possible to select a desired format from a plurality of formats, and thus the usability is high.

Figure 5:
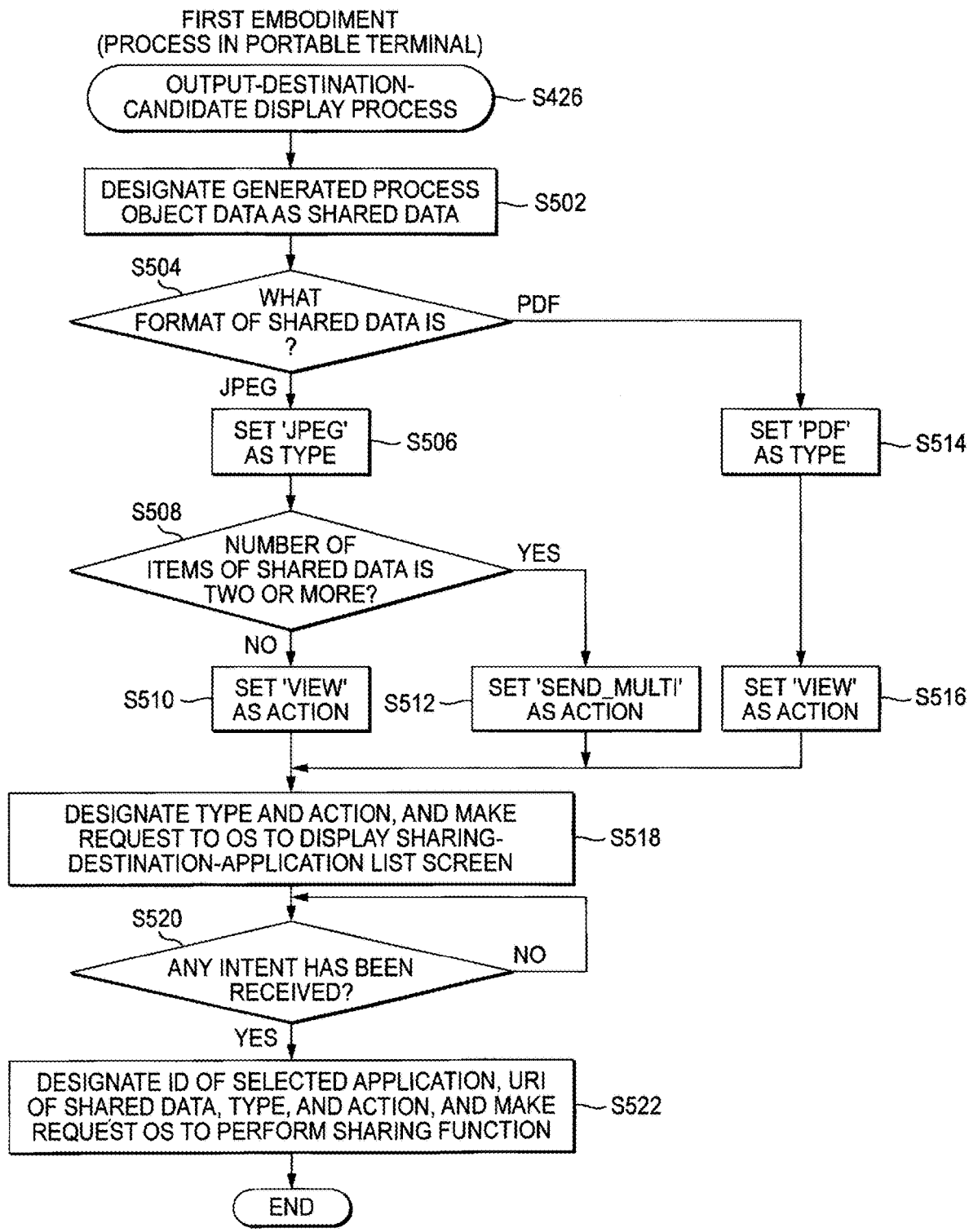
FIG. 5 is a flow chart illustrating an output-destination-candidate display process of the first embodiment.

FIG. 5 is a flow chart illustrating an output-destination-candidate display process (STEP S426). This process is for calling the API of the OS 14a, searching for candidates for the sharing destination application 64, and making the LCD 18 display the sharing-destination-application list screen 81 (FIG. 3). As described with reference to FIG. 4, this process starts after the generating of the process object data is completed.

First, in STEP S502, the CPU 11 designates the process object data generated in the memory card 20, as the shared data. In a case where the format of the shared data is PDF ('PDF' in STEP S504), in STEP S514, the CPU 11 sets 'PDF' as the type, and in STEP S516, the CPU 11 sets 'VIEW' as the action.

Next, in STEP S518, the CPU 11 calls the API of the OS 14a, designates the type and the action set in STEP S514 or STEP S516, and makes a request to the OS 14a to display the sharing-destination-application list screen 81. As a result, the OS 14a searches for applications declaring 'PDF' and 'VIEW' as the type and the action, respectively, and displays the names 82 of the found applications on the sharing-destination-application list screen 81. The action 'VIEW' is an action representing a data display process, and most applications declare the action 'VIEW'. Therefore, if 'VIEW' is designated as the action, it is possible to display more applications on the sharing-destination-application list screen 81.

Then, until any intent is received from the OS 14a (in a case of No in STEP S520), the CPU 11 stands by. If the sharing destination application 64 is selected on the sharing-destination-application list screen 81, and an intent including the identification information of the sharing destination application 64 is received from the OS 14a (Yes in STEP S520), in STEP S522, the CPU 11 calls the API of the OS 14a, designates the identification information of the sharing destination application 64, the URI of the shared data, and the same type and action as those designated in STEP S518, and makes a request to the OS 14a to perform the sharing function (explicit sharing function). In other words, the CPU 11 notifies the OS 14a of the URI of the process object data which is the shared data, and finishes the output-destination-candidate display process.

Meanwhile, in a case where the format of the shared data is JPEG ('JPEG' in STEP S504), in STEP S506, the CPU 11 sets 'JPEG' as the type. Next, in a case where the number of items of the JPEG data designated as the shared data is one (No in STEP S508), in STEP S510, the CPU 11 sets 'VIEW' as the action. Then, in STEP S518, the CPU 11 designates the type and the action designated in STEP S506 and STEP S510, respectively, and makes a request to the OS 14a to display the sharing-destination-application list screen 81. In this case, the OS 14a searches for applications declaring the type 'JPEG' and the action 'VIEW', and displays the names 82 of the found applications on the sharing-destination-application list screen 81.

Meanwhile, in a case where the number of items of the JPEG data designated as the shared data is two or more (Yes in STEP S508), in STEP S512, the CPU 11 sets 'SEND_ULTI' as the action. Then, in STEP S518, the CPU 11 designates the type and the action designated in STEP S506 and STEP S512, respectively, and makes a request to the OS 14a to display the sharing-destination-application list screen 81. In this case, the OS 14a searches for applications declaring the type 'JPEG' and the action 'SEND_MULTI', and displays the names 82 of the found applications on the sharing-destination-application list screen 81. Here, the action 'SEND_MULTI' is an action representing transmission of a plurality of data items, and is declared only by applications capable of processing a plurality of data items. Therefore, the user can select an application capable of processing a plurality of JPEG data items from the sharing-destination-application list screen 81.

Next, in a case where an intent is received from the OS 14a (Yes in STEP S520), in STEP S522, the CPU 11 calls the API of the OS 14a, designates the identification information of the sharing destination application 64, the URI of the shared data, and the same type and action as those designated in STEP S518, makes a request to the OS 14a to perform the sharing function. Then, the CPU 11 finishes the output-destination-candidate display process. In a case where the number of items of the JPEG data is two or more, the CPU 11 notifies the OS 14a of the URI of each of the plurality of items of the JPEG data as the URI of the shared data.

According to the output-destination-candidate display process of STEP S426, in a case where data having any one of the PDF format and the JPEG format is processed by the sharing function, it is possible to make the user visibly recognize the applications selectable as the data output destination according to the sharing function. In other words, the list of the applications capable of processing data having the format selected from the PDF format and the JPEG format by the user is displayed on the LCD 18. Therefore, the usability is high. Further, in a case where the shared data is JPEG data, applications displayed on the LCD 18 when the number of items of the JPEG data is one can be different from applications displayed on the LCD 18 when the number of items of the JPEG data is or two or more. Therefore, the usability is high.

Furthermore, after the process object data is generated, the URI of the process object data (that is, the shared data) is notified to the OS 14*a*. Therefore, it is possible to reliably make the sharing destination application 64 process the process object data.

Figure 6:
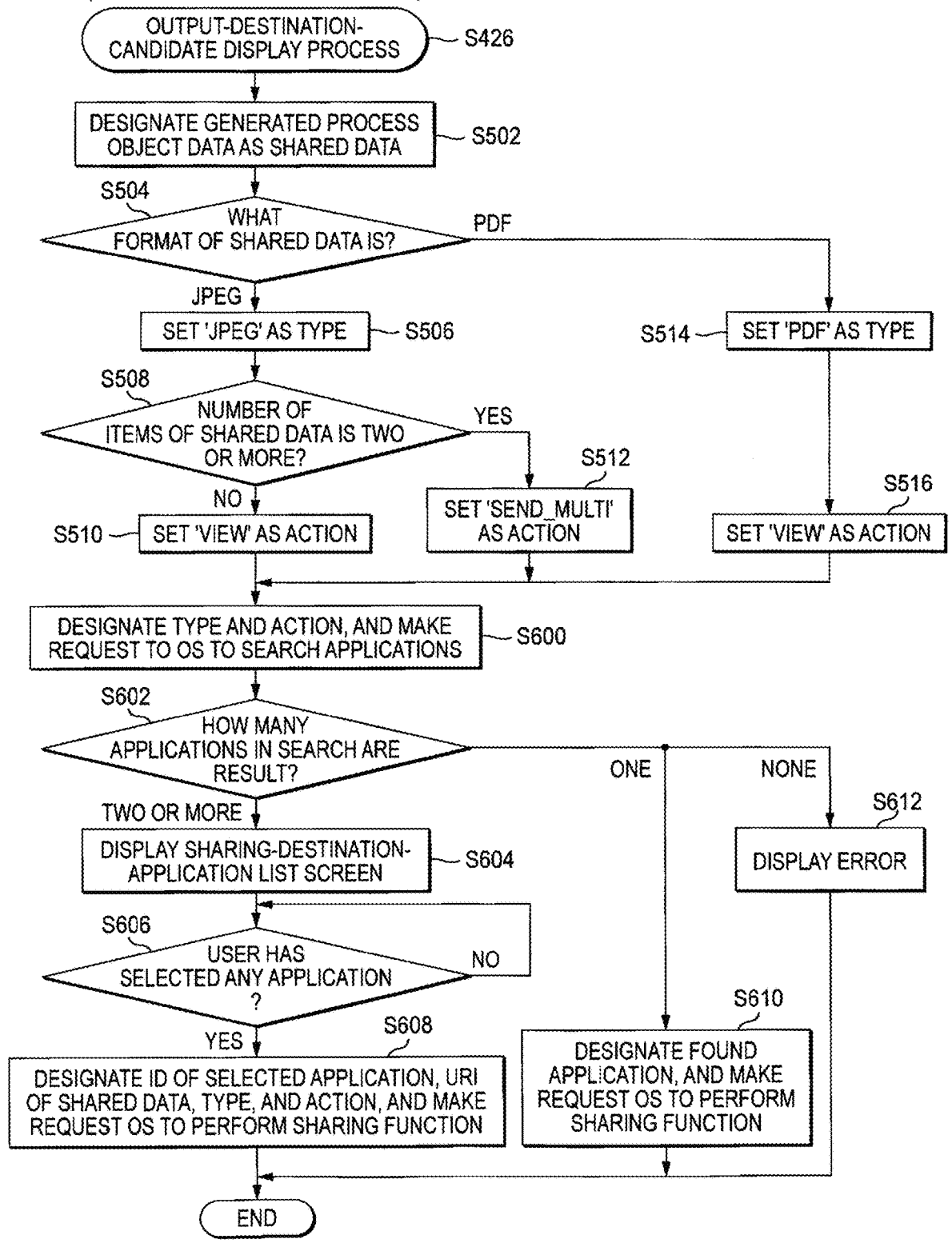
FIG. 6 is a flow chart illustrating an output-destination-candidate display process of a second embodiment.

A second embodiment will be described with reference to FIG. 6. FIG. 6 is a flow chart illustrating an output-destination-candidate display process (STEP S426) according to the second embodiment. The present application 14*b* of the second embodiment is identical to the first embodiment except that, instead of the output-destination-candidate display process (FIG. 5) of the first embodiment, the output-destination-candidate display process (STEP S426) shown in FIG. 6 is performed. The identical portion of the output-destination-candidate display process (STEP S426) shown in FIG. 6 as that of the output-destination-candidate display process (FIG. 5) of the first embodiment is denoted by the same step number, and the redundant description will not be repeated.

In the output-destination-candidate display process (STEP S426) of the second embodiment, in STEP S600, the CPU 11 calls the API of the OS 14*a*, designates the type and the action, and searches the applications. Specifically, the CPU 11 makes a request to the OS 14*a* to search for applications capable of data having the format designated by the type set in STEP S506 or STEP S514 and supporting the kind of the process designated by the action designated in STEP S510, STEP S512, or STEP S516.

Next, if the number of applications found as the search result is two or more ('TWO OR MORE' in STEP S602), in STEP S604, the CPU 11 generates data for displaying the sharing-destination-application list screen 81 representing the applications of the search result on the LCD 18, designates that data, calls the API of the OS 14*a*, and makes the OS 14*a* to display the sharing-destination-application list screen 81. That is, in the first embodiment, the sharing-destination-application list screen 81 generated by the OS 14*a* is displayed on the LCD 18. However, in the second embodiment, the sharing-destination-application list screen 81 generated by the present application 14*b* is displayed on the LCD 18. Then, until the user selects any one application (in a case of No in STEP S606), the CPU 11 stands by.

If the user selects any one application (Yes in STEP S606), in STEP S608, the CPU 11 determines the application selected by the user, as the sharing destination application 64, designates the identification information of the sharing destination application 64, the URI of the shared data, the type, and the action, calls the API of the OS 14*a*, and makes a request to the OS 14*a* to perform the sharing function. Then, the CPU 11 finishes the output-destination-candidate display process. In this case, the OS 14*a* activates the designated sharing destination application 64, notifies the URI of the shared data notified from the present application 14*b* to the sharing destination application 64, and makes the sharing destination application 64 process the shared data. Therefore, it is possible to obtain the same effects as those of the first embodiment.

Meanwhile, in a case where there is one application found as the search result ('ONE' in STEP S602), in STEP S610, the CPU 11 designates the one application as the sharing destination application 64, without displaying the sharing-destination-application list screen 81, designates the identification information of the sharing destination application 64, the URI of the shared data, the type, and the action, calls the API of the OS 14*a*, and makes a request to the OS 14*a* to perform the sharing function. Then, the CPU 11 finishes the output-destination-candidate display process. In this case, the user does not need to perform work to select the sharing destination application 64. Therefore, it is possible to further improve the operability, as compared to the first embodiment. In a case where there is no application satisfying the criteria as the search result ('NONE' in STEP S602), the CPU 11 makes the LCD 18 display an error in STEP S612, and finishes the output-destination-candidate display process.

Figure 7B:
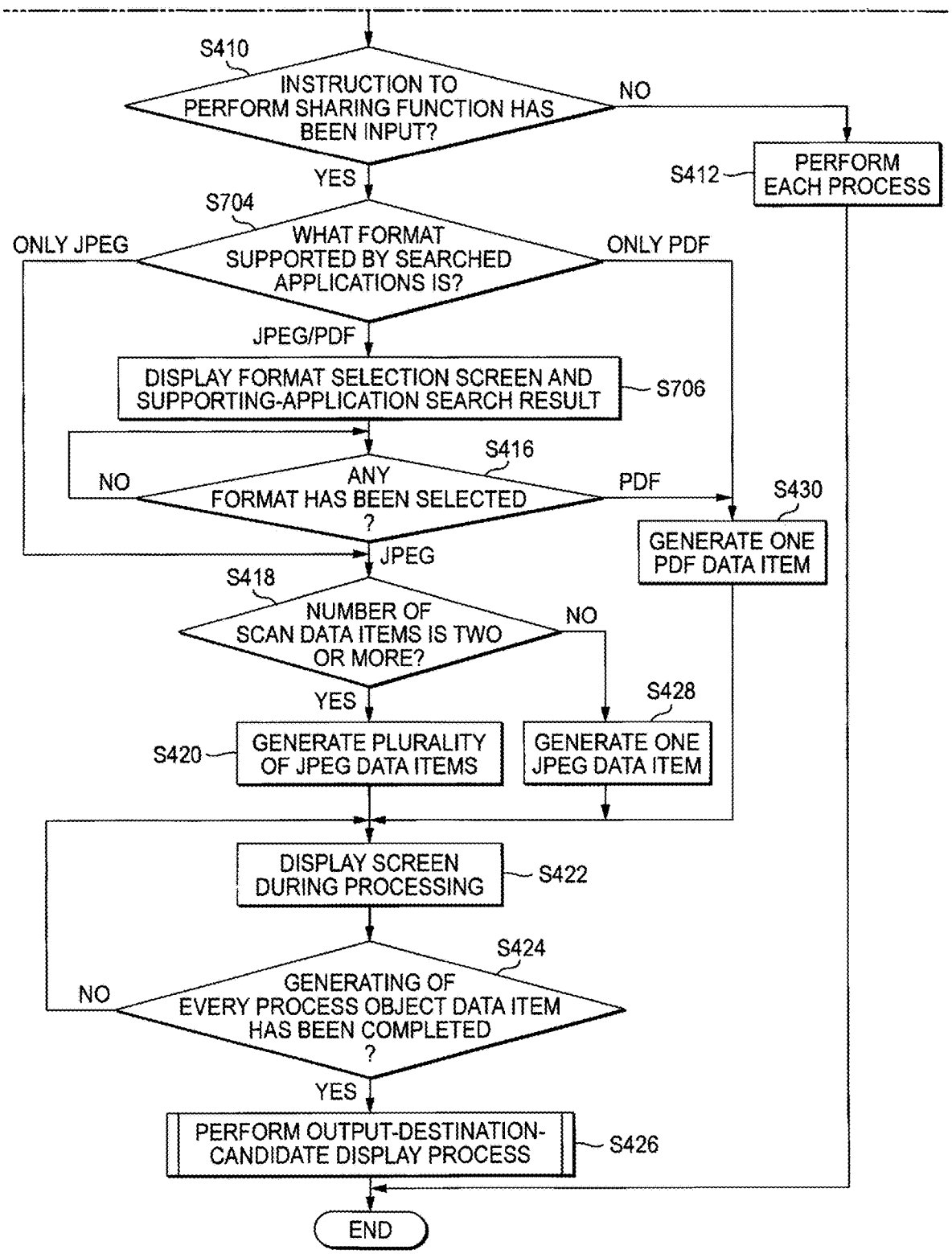

A third embodiment will be described with reference to FIG. 7. FIG. 7 is a flow chart illustrating a scan process of a third embodiment. The present application 14*b* of the third embodiment is identical to the first embodiment except that, instead of the scan process (FIG. 4) of the first embodiment, the scan process shown in FIG. 7 is performed. The identical portion of the scan process shown in FIG. 7 as that of the scan process of the first embodiment described with reference to FIG. 4 is denoted by the same step number, and the redundant description will not be repeated.

In the scan process of the third embodiment, in STEP S702, an advance supporting-application search process of searching for applications capable of processing JPEG data (hereinafter, JPEG supporting applications), and searching for applications capable of processing PDF data (hereinafter, PDF supporting applications) is performed, and if one side of PDF supporting applications or JPEG supporting applications is found by searching, an input of an instruction to perform the sharing function is acceptable.

Figure 8:
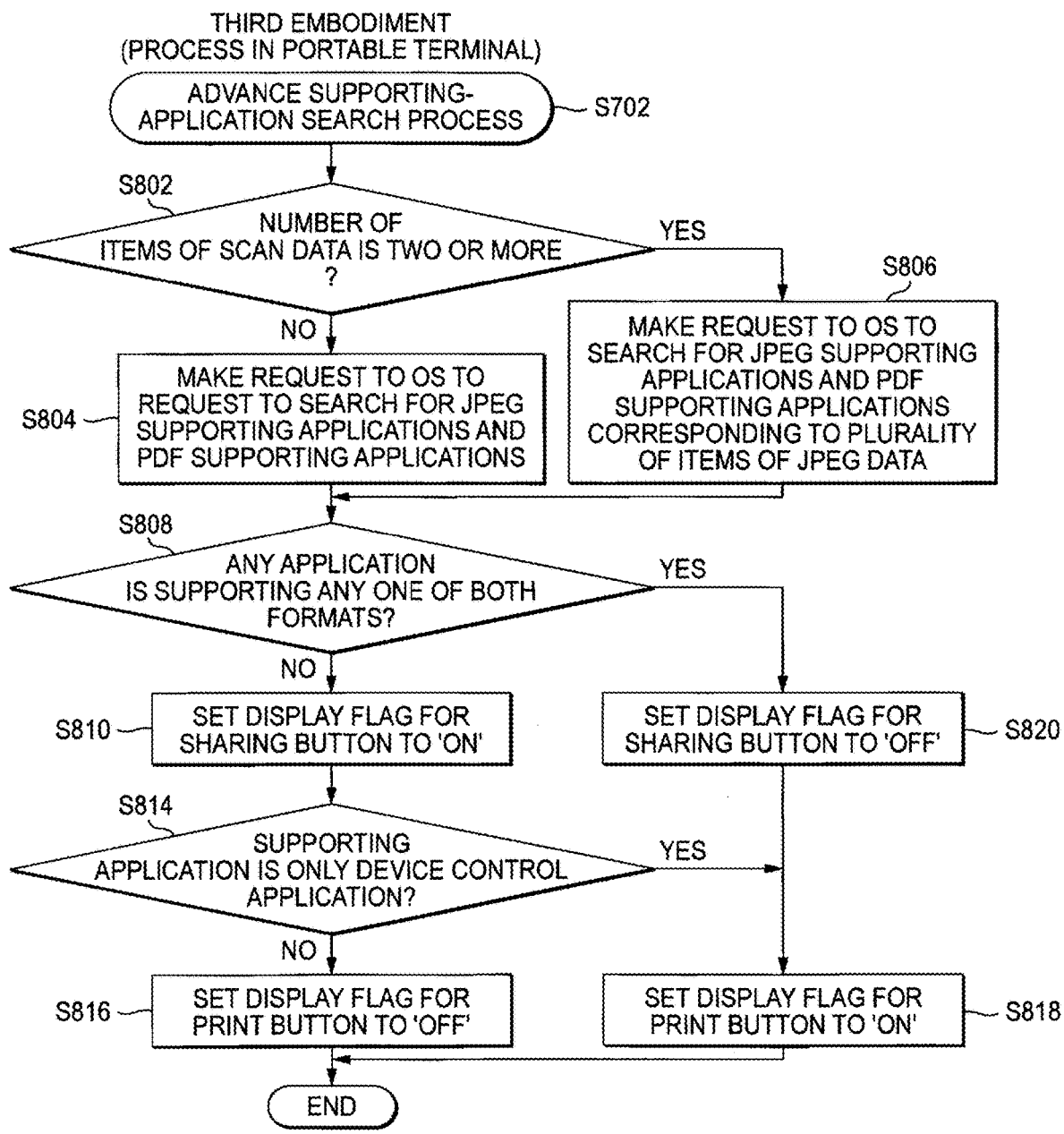
FIG. 8 is a flow chart illustrating an advance supporting-application search process.

FIG. 8 is a flow chart illustrating the advance supporting-application search process (STEP S702). In a case where one scan data item is acquired from the device 30 (NO in STEP S802), in STEP S804, the CPU 11 searches for JPEG supporting applications and PDF supporting applications. Specifically, the CPU 11 calls the API of the OS 14*a*, designates 'VIEW' as the action, designates 'JPEG' or 'PDF' as the type, and makes a request to the OS 14*a* to search for supporting applications.

Meanwhile, in a case where a plurality of scan data items is acquired from the device 30 (Yes in STEP S802), in STEP S806, the CPU 11 searches for PDF supporting applications and JPEG supporting applications supporting the plurality of items of the JPEG data. Specifically, the CPU 11 calls the API of the OS 14*a*, designates the action 'SEND_MULTI' and the type 'JPEG', and makes a request to the OS 14*a* to search for applications supporting the action and the type. Also, the CPU 11 calls the API of the OS 14*a*, designates the action 'VIEW' and the type 'PDF', and makes a request to the OS 14*a* to search for applications supporting the action and the type.

In a case where at least one side of the JPEG supporting applications and the PDF supporting applications is found by the searching (No in STEP S808), in STEP S810, the CPU 11 sets a display flag for the sharing button 74 to 'ON'. If only the present application 14*b* (application's own self) is found by the searching (Yes in STEP S814), the CPU 11 sets a display flag for a print button (not shown) to 'ON', in STEP S818, and finishes the advance supporting-application search process. Meanwhile, if there is any supporting application other than the present application 14*b* (No in STEP S814), the CPU 11 sets the display flag for the print button to 'OFF' in STEP S816, and finishes the advance supporting-application search process.

Next, a case where there is no JPEG supporting application and PDF supporting application found will be described. In this case (Yes in STEP S808), the CPU 11 sets the display flag for the sharing button 74 to 'OFF' in STEP S820, sets the display flag for the print button to 'ON' in STEP S818, and finishes the advance supporting-application search process.

Referring to FIG. 7 again, a description will be made. Next, in STEP S703, the CPU 11 makes the LCD 18 display the scan-result confirmation screen 70. Here, in a case where the display flag for the sharing button 74 is in an ON state according to the advance supporting-application search process (FIG. 8), the sharing button 74 is displayed on the scan-result confirmation screen 70 (FIG. 3). In other words, in a case where at least one side of JPEG supporting applications and PDF supporting applications has been found by the searching, that is, a case where there is any application selectable as the sharing destination, an input of an instruction to perform the sharing function is acceptable.

Even when at least one side of JPEG supporting applications and PDF supporting applications has been found by the searching, in a case where only the present application 14b has been found by the searching, the display flag for the print button is set to 'ON' according to the advance supporting-application search process (FIG. 8). In this case, in the process of STEP S703, not only the sharing button 74 but also the print button (not shown) for receiving an print instruction are displayed on the scan-result confirmation screen 70 (FIG. 3).

Next, if the user performs manipulation input (Yes in STEP S408), and the manipulation input is touching the sharing button 74 (Yes in STEP S410), the CPU 11 proceeds to the process of STEP S704. Meanwhile, in a case where the manipulation input is touching the print button, that is, a case where a print instruction input is received by the print button (No in STEP S410), in STEP S412, the CPU 11 instructs the device 30 to print the scan data received from the device 30. Therefore, in the case where only the present application 14b has been found by the searching, that is, a case where it is impossible to provide the data to another application, the user can input a print instruction, and thus the usability is high. In a case where the print button has been touched, it is possible to generate a print preview image based on the current print options (for example, an option on a print layout, and an option on a paper size), display the print preview image on the LCD 18, and make the user to confirm whether to perform print based on the current print options.

In a case where the display flag of the sharing button 74 is in the OFF state according to the advance supporting-application search process (STEP S702), in the process of STEP S703, the CPU 11 makes the LCD 18 display the scan-result confirmation screen 70, without the sharing button 74 or with the sharing button 74 grayed out. In other words, an input of an instruction to perform the sharing function is restricted. Therefore, it is possible to prevent the user from inputting an instruction to perform the sharing function even though it is impossible to perform the sharing function since there is no application satisfying the criteria for the sharing destination application 64, and thus the usability is high.

Further, in the scan process of the third embodiment, in a case where there are JPEG supporting applications and PDF supporting applications found ('JPEG/PDF' in STEP S704), in STEP S706, the CPU 11 makes the LCD 18 display not only the format selection screen 77 (FIG. 3) but also the supporting application search result in the advance supporting-application search process (STEP S702). Specifically, the CPU 11 generates data for making the LCD 18 display a list of JPEG supporting applications found by the advance supporting-application search process (STEP S702), and a list of found PDF supporting applications, designates that data, calls the API of the OS 14a, and makes the LCD 18 display the supporting application search result.

In other words, before the user selects any one of the JPEG format and the PDF format, the CPU 11 makes the LCD 18 display the list of applications searched for by the advance supporting-application search process (STEP S702). In this case, the user can select any one format with reference to the list of selectable applications. In the present embodiment, format selection screen 77 and the supporting application search result are simultaneously displayed on the LCD 18. However, for example, after the supporting application search result is displayed, the supporting application search result display screen may transition to the format selection screen 77.

In a case where only JPEG supporting applications have been found and any PDF supporting application has not been found by the advance supporting-application search process (STEP S702) ('ONLY JPEG' in STEP S704), the CPU 11 proceeds to the process of STEP S418 in which the CPU 11 generates JPEG data, and then the CPU 11 performs the same subsequent processes as those in the first embodiment.

Meanwhile, in a case where only PDF supporting applications have been found and any JPEG supporting application has not been found by the advance supporting-application search process (STEP S702) ('ONLY PDF' in STEP S704), the CPU 11 proceeds to the process of STEP S430 in which the CPU 11 generates PDF data, and then the CPU 11 performs the same subsequent processes as those in the first embodiment.

In other words, in a case where only JPEG supporting applications or PDF supporting applications supporting one format has been found, displaying of the format selection screen 77 is skipped, so as to prohibit selection of the other format. Therefore, it is possible to prevent the user from selecting the other format incapable of being processed in another application, and thus the usability is high.

In the above-mentioned embodiments, the portable terminal 10 is an example of an information processing apparatus. The device 30 is an example of an image information source and a print device. The sharing destination application 64 is an example of an application selected as a data output destination. The CPU 11 which performs the sharing function according the OS 14a is an example of a data sharing unit.

The CPU 11 is an example of a computer, a data generating unit, a notifying unit, a first search unit, a second search unit, a third search unit, an input restricting unit, a selection restricting unit, a determining unit, and a process-object-data generating means. The LCD 18 is an example of a display unit. The touch panel 17 is an example of a receiving unit. The type is an example of format information, and the action is an example of use information. The JPEG supporting application is an example of a first kind of application, and the PDF supporting application is a second kind of application. The wireless LAN transceiver 15 is an example of the image information source and an instructing unit. However, each of the data generating unit, the notifying unit, the first search unit, the second search unit, the third search unit, the input restricting unit, the selection restricting unit, the determining unit, the instructing unit, the receiving unit, and the display unit may be a single piece of hardware, or hardware which operates by executing the programs according to the present disclosure or programs such as an operating system other than the programs of the present disclosure. Each of those units may be software which is executed by a combination of processes according to a plurality of programs.

Although the aspect of the present disclosure has been described based on the embodiments, it is easily inferable that the present invention is not limited to the above-mentioned embodiments, but may be variously modified for improvement without departing from the scope of the invention.

For example, in the above-mentioned embodiments, the portable terminal 10 having a call function is an example of the information processing apparatus. However, examples of the information processing apparatus may include various apparatuses without a call function, such as a personal computer and a digital camera. Further, the present invention is applicable to apparatuses which include hard keys for manipulation input, without the touch panel 17.

In the above-mentioned embodiments, an example of a first format is the JPEG format, and an example of a second format is the PDF format. However, the present invention is not limited thereto. For example, various formats such as PNG, GIF, and BMP may be an example of the first format. Also, various formats such as DOC and XLS may be an example of the second format.

In the above-mentioned embodiments, the JPEG data and the PDF data is stored in the memory card 20 installable and removable with respect to the portable terminal 10. However, those data may be stored in the flash memory 104 built in the portable terminal 10.

In the above-mentioned embodiments, the scan data has been described as an example of image data. However, the image data is not limited thereto but may be, for example, image data acquired by imaging of a digital camera built in the portable terminal 10. In this case, the digital camera is an example of the image information source. Also, data generated by reducing or enlarging the scan data in accordance with the size of the scan image 71 to be displayed on the LCD 18 may be an example of the image data. Further, in the portable terminal 10, in a case of converting the scan data into a predetermined format for displaying the scan image 71 on the LCD 18, the converted data having the predetermined format may be an example of the image data.

In the above-mentioned embodiments, a case where the scan data is the raw image data has been described. However, even in a case where JPEG data is acquired as the scan data from the device 30, the present invention can be applied.

In the above-mentioned embodiments, the generation is converting the image data acquired from the device 30 into a file having a selected format. In this case, the URI of the shared data is composed of a file path. However, the generation may be converting the image data acquired from the device 30 into contents having a process object format. In this case, the URI of the shared data may be configured in a format (contents format) that specifies the data by an index and ID of an application, like 'Contents:/// device-control1/attach/1'.

In the above-mentioned embodiments, in a case where the shared data is PDF data, and in a case where the shared data is a single JPEG data item, 'VIEW' is designated as the action value. However, other actions such as 'SEND' may be designated. In the case where the shared data is PDF data and the case where the shared data is a single JPEG data item, different action values may be designated. For example, in the case where the shared data is PDF data, 'VIEW' may be designated, and in the case where the shared data is a single JPEG data item, 'SEND' may be designated.

In the above-mentioned embodiments, a case where the OS 14a is an upload OS has been described. However, the present invention is also applicable to an information processing apparatus having another OS installed therein.

In the above-mentioned embodiments, the sharing function is implemented by the OS 14a. However, the present invention is also applicable to a case where the sharing function is implemented by hardware or middleware.

In the above-mentioned embodiments, the portable terminal 10 and the device 30 make a Wi-Fi connection. However, the present invention is also applicable to a case where the portable terminal 10 and the device 30 are connected by Bluetooth (registered as a trademark).

In the above-mentioned embodiments, in a case where the user touches the sharing button 74, the format selection screen 77 is displayed on the LCD 18. However, after the user selects a format from the format selection screen 77, the sharing button 74 may be displayed on the LCD 18 such that an instruction to perform the sharing function is acceptable. Alternatively, after the format selection screen 77 is displayed on the LCD 18 and the user selects a format, the device 30 may be instructed to perform scan.

In a case where only JPEG supporting applications have been found and any PDF supporting application has not been found by the advance supporting-application search process (STEP S702) ('ONLY JPEG' in STEP S704), or in a case where only PDF supporting applications have been found and any JPEG supporting application has not been found by the advance supporting-application search process ('ONLY PDF' in STEP S704), that is, in a case where only supporting applications supporting one format has been found, the CPU 11 may gray out the format selection screen 77 (FIG. 3) and then make the LCD 18 display the supporting application search result of the advance supporting-application search process (STEP S702), thereby restricting a selection of the other format.

In the above-mentioned embodiments, the names 82 of the applications included in the sharing-destination-application list screen 81 (FIG. 3) correspond to examples of identification images for identifying the applications. However, the identification images of the applications may be icon images of the applications.

In the above-mentioned embodiments, the explicit sharing function of the portable terminal 10 is used. However, the present invention is also applicable to a case of using the implicit sharing function. That is, as described above with reference to FIG. 2A, in the implicit sharing function, after the sharing-destination-application list screen 81 is displayed, the sharing source application 60 is not involved in the selection of the sharing destination application 64 (see (5) of FIG. 2A) and the activation of the sharing destination application 64 (see (6) of FIG. 2A). Therefore, if the sharing-destination-application list screen 81 is displayed before the generation of the data is completed, the user may select the sharing destination application 64 from the sharing-destination-application list screen 81 before the generation of the data, such that the sharing destination application 64 is activated by the OS 14a, so as to start to access the shared data. In this case, since the sharing destination application 64 cannot access the shared data notified from the OS 14a, the user should cope with a standby time or error of unknown cause, and thus it is possible to make the user inconvenient. Therefore, according to the present invention, as described in the above-mentioned embodiments, since the sharing-destination-application list screen 81 is displayed after the process object data is generated, even in a case of using the implicit sharing function of the OS 14a, the above-mentioned problem is solved.

In the above-mentioned embodiments, the present application 14b can generate data in two kinds of formats. However, the present invention is also applicable to a program which can generate data in three or more formats. In this case, among the three or more kinds of formats capable of being generated by that program, two arbitrary kinds correspond to examples of the first format and the second format, respectively.

The data for displaying the sharing-destination-application list screen 81 on the application-information display means may be generated by the OS 14a as in the output-destination-candidate display process of STEP S518 (FIG. 5) of the first embodiment, or may be generated by the present application 14b as in the output-destination-candidate display process of STEP S604 (FIG. 6) of the second embodiment.

Similarly, each of the first search control means, the second search control means, and the third search control means may call the API, and make the OS 14a search the applications, or may make the present application 14b search the applications.

An embodiment which is an appropriate combination of the features of the above-mentioned first to third embodiments may be used.

What is claimed is:

1. A non-transitory computer-readable storage medium storing computer-readable instructions executable by a processor of an information processing apparatus comprising a display and a communication interface,
wherein the instructions, when executed by the processor, cause the information processing apparatus to execute:
receiving an instruction of executing a scan process;
transmitting the received instruction of executing the scan process to a scanner through the communication interface;
obtaining an image file in a first format or in a second format, the image file being generated from scan data acquired in the scanner according to the instruction of executing the scan process;
receiving designation for the information processing apparatus to share the obtained image file; and
displaying, on the display, identification information for identifying an application capable of processing the obtained image file after receiving the designation,
wherein the displaying includes:
displaying identification information for identifying a first sharing-destination-application capable of processing an image file of the first format in a case where the obtained image file has the first format; and
displaying identification information for identifying a second sharing-destination-application capable of processing an image data of the second format in a case where the obtained image file has the second format.

2. The non-transitory computer-readable storage medium according to claim 1,
wherein in a case where receiving the designation, the instructions cause the information processing apparatus to execute determining whether the obtained image file has the first format or the second format.

3. The non-transitory computer-readable storage medium according to claim 1,
wherein after receiving a selection of the identification information for identifying an application, the instructions cause the information processing apparatus to execute sharing the image file with an application identified by the selected identification information.

4. The non-transitory computer-readable storage medium according to claim 1,
wherein, the displaying includes displaying plural identification information in a case where there is a plurality of applications capable of processing the obtained image file.

5. The non-transitory computer-readable storage medium according to claim 1,
wherein the instructions further cause the information processing apparatus to execute displaying a preview image based on the scan data.

6. The non-transitory computer-readable storage medium according to claim 1,
wherein the first format is a JPEG format, and the second format is a PDF format.

7. The non-transitory computer-readable storage medium according to claim 1,
wherein the scan data is JPEG data or raw image data acquired in the scanner.

8. The non-transitory computer-readable storage medium according to claim 1,
wherein the display includes an LCD.

9. The non-transitory computer-readable storage medium according to claim 1,
wherein the identification information includes a character string.

10. An information processing apparatus comprising:
a display;
a communication interface;
a processor; and
a memory storing instructions that, when executed by the processor, cause the processor to:
receive an instruction of executing a scan process;
transmit the received instruction of executing the scan process to a scanner through the communication interface;
obtain an image file in a first format or in a second format, the image file being generated from scan data acquired in the scanner according to the instruction of executing the scan process;
receive designation for the information processing apparatus to share the obtained image file; and
display, on the display, identification information for identifying an application capable of processing the obtained image file after receiving the designation,
wherein the displaying includes:
displaying identification information for identifying a first sharing-destination-application capable of processing an image file of the first format in a case where the obtained image file has the first format; and
displaying identification information for identifying a second sharing-destination-application capable of processing an image data of the second format in a case where the obtained image file has the second format.

11. An information processing method which is performed in an information processing apparatus including a display and a communication interface, the information processing method comprising the steps of:
receiving an instruction of executing a scan process;
transmitting the received instruction of executing the scan process to a scanner through the communication interface;

obtaining an image file in a first format or in a second format, the image file being generated from scan data acquired in the scanner according to the instruction of executing the scan process;

receiving designation for the information processing apparatus to share the obtained image file; and displaying, on the display, identification information for identifying an application capable of processing the obtained image file after receiving the designation, wherein the displaying includes:

displaying identification information for identifying a first sharing-destination-application capable of processing an image file of the first format in a case where the obtained image file has the first format; and displaying identification information for identifying a second sharing-destination-application capable of processing an image data of the second format in a case where the obtained image file has the second format.

\* \* \* \* \*